United States Patent
Yabe et al.

(10) Patent No.: US 10,310,460 B2
(45) Date of Patent: Jun. 4, 2019

(54) MANAGEMENT DEVICE, MANAGEMENT SYSTEM, MANAGEMENT METHOD, AND PROGRAM

(71) Applicant: Mitsubishi Electric Corporation, Tokyo (JP)

(72) Inventors: Masaaki Yabe, Tokyo (JP); Satoshi Minezawa, Tokyo (JP); Yuki Ogawa, Tokyo (JP); Hirotoshi Yano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 262 days.

(21) Appl. No.: 14/432,360

(22) PCT Filed: Oct. 18, 2013

(86) PCT No.: PCT/JP2013/078366
§ 371 (c)(1),
(2) Date: Mar. 30, 2015

(87) PCT Pub. No.: WO2014/061799
PCT Pub. Date: Apr. 24, 2014

(65) Prior Publication Data
US 2015/0241859 A1    Aug. 27, 2015

(30) Foreign Application Priority Data
Oct. 18, 2012    (JP) .................... 2012-230745

(51) Int. Cl.
*G02B 15/02*  (2006.01)
*H04L 12/28*  (2006.01)
(Continued)

(52) U.S. Cl.
CPC .......... *G05B 15/02* (2013.01); *H02J 13/0006* (2013.01); *H04L 12/2823* (2013.01);
(Continued)

(58) Field of Classification Search
CPC ... G05B 15/02; H04L 12/2823; H04L 43/103; H02J 13/0006; H04Q 9/00;
(Continued)

(56) References Cited

U.S. PATENT DOCUMENTS 3,405,279 A * 10/1968 Ross .................. H02J 3/00
                                                   307/29
3,465,164 A *  9/1969 Couvreur ............ H02J 3/00
                                                   307/57
(Continued)

FOREIGN PATENT DOCUMENTS

CN    1277079 C       9/2006
JP    H10-013973 A    1/1998
(Continued)

OTHER PUBLICATIONS

International Search Report of the International Searching Authority dated Nov. 12, 2013 for the corresponding international application No. PCT/JP2013/078366 (and English translation).
(Continued)

*Primary Examiner* — Brian W Wathen
*Assistant Examiner* — Mohammed Shafayet
(74) *Attorney, Agent, or Firm* — Posz Law Group, PLC

(57) ABSTRACT

A communicator communicates with a plurality of management targets. An operation-mode determiner determines, based on information representing a status of each of the management targets each received by the communicator, whether a total system status of the plurality of management targets satisfies a predefined condition. A mode-of-network-communication switch, a communication-parameter changer, a condition-for-device-communication setter, a cycle-for-obtaining-status-value setter and a communication-parameter setter adjust, when the operation-mode determiner determines that the system status satisfies the pre-
(Continued)

defined condition, a communication status of the communicator in accordance with the system status and a processing performance of the device.

12 Claims, 9 Drawing Sheets

(51) Int. Cl.
*H02J 13/00* (2006.01)
*H04Q 9/00* (2006.01)
*H04L 12/26* (2006.01)
*G05B 15/02* (2006.01)

(52) U.S. Cl.
CPC ............ *H04Q 9/00* (2013.01); *H04L 43/103* (2013.01); *H04Q 2209/60* (2013.01); *Y02B 70/325* (2013.01); *Y04S 20/228* (2013.01); *Y04S 40/168* (2013.01)

(58) Field of Classification Search
CPC . H04Q 2209/60; Y04S 40/168; Y04S 20/228; Y02B 70/325
USPC .......................... 709/230, 223, 238; 700/295
See application file for complete search history.

(56) References Cited

U.S. PATENT DOCUMENTS

| | | | | |
|---|---|---|---|---|
| 5,922,051 A * | 7/1999 | Sidey | ............... | H04L 41/0213 709/223 |
| 7,561,977 B2 * | 7/2009 | Horst | ............ | H02J 3/14 700/295 |
| 7,839,275 B2 * | 11/2010 | Spalink | ............ | F24F 11/006 236/44 R |
| 7,853,816 B2 * | 12/2010 | Tanaka | ............ | G06F 1/3209 713/322 |
| 7,975,155 B2 * | 7/2011 | Rozen | ............ | G06F 1/3203 700/295 |
| 8,473,111 B1 * | 6/2013 | Shankar | ............ | H02J 3/14 700/293 |
| 9,300,138 B2 * | 3/2016 | Chen | ............ | H02J 3/008 |
| 2003/0233201 A1 * | 12/2003 | Horst | ............ | H02J 3/14 700/295 |
| 2004/0111724 A1 * | 6/2004 | Libby | ............ | G06Q 10/06 718/100 |
| 2004/0190452 A1 * | 9/2004 | Imiya | ............ | H04L 43/00 370/232 |
| 2004/0254654 A1 * | 12/2004 | Donnelly | ............ | H02J 3/14 700/22 |
| 2004/0255601 A1 | 12/2004 | Kwon et al. | | |
| 2005/0187727 A1 * | 8/2005 | Weik | ............ | H02J 3/14 700/291 |
| 2006/0133181 A1 * | 6/2006 | Amano | ............ | G11C 5/141 365/229 |
| 2007/0008907 A1 * | 1/2007 | Odate | ............ | G06F 15/7867 370/256 |
| 2009/0238073 A1 * | 9/2009 | Sanjeewa | ............ | H04L 43/0882 370/235 |
| 2010/0072817 A1 * | 3/2010 | Hirst | ............ | H02J 3/14 307/31 |
| 2011/0068755 A1 * | 3/2011 | Schaefert | ............ | B60L 11/1881 323/234 |
| 2011/0153107 A1 * | 6/2011 | Kim | ............ | G06F 1/3203 700/295 |
| 2012/0022711 A1 * | 1/2012 | Sakaguchi | ............ | H02J 13/0017 700/295 |
| 2012/0123600 A1 * | 5/2012 | Krause | ............ | G05B 15/02 700/286 |
| 2012/0271472 A1 * | 10/2012 | Brunner | ............ | G06F 1/3209 700/295 |
| 2012/0316695 A1 * | 12/2012 | Chen | ............ | H02J 3/008 700/296 |
| 2013/0245851 A1 * | 9/2013 | Ahn | ............ | G06Q 10/06 700/295 |
| 2013/0329632 A1 * | 12/2013 | Buyukkoc | ............ | H04W 4/00 370/328 |
| 2014/0018971 A1 * | 1/2014 | Ellis | ............ | G06Q 10/04 700/297 |
| 2014/0303801 A1 * | 10/2014 | Ahn | ............ | H02J 3/14 700/295 |
| 2015/0323948 A1 * | 11/2015 | Jeong | ............ | G05F 1/66 700/291 |

FOREIGN PATENT DOCUMENTS

| | | |
|---|---|---|
| JP | 2009-180414 A | 8/2009 |
| JP | 2010-028562 A | 2/2010 |
| JP | 2012-115115 A | 6/2012 |

OTHER PUBLICATIONS

Office Action dated Oct. 31, 2017 issued in corresponding CN patent application No. 201380054268.7 (and English translation).
Office action dated Mar. 22, 2018 issued in corresponding CN patent application No. 201380054268.7 (and English translation thereof).

* cited by examiner

MANAGEMENT DEVICE, MANAGEMENT SYSTEM, MANAGEMENT METHOD, AND PROGRAM

CROSS REFERENCE TO RELATED APPLICATION

This application is a U.S. national stage application of PCT/JP2013/078366 filed on Oct. 18, 2013, which claims priority to Japanese Patent Application No. 2012-230745, filed on Oct. 18, 2012, the disclosures of which are incorporated herein by reference.

TECHNICAL FIELD

The present disclosure relates to a management device, a management system, a management method, and a program.

BACKGROUND ART

A system which detects, for example, through multiple sensor units, temperatures and degree of humidity at multiple locations of a cultivation facility for vegetables and flowers, and further an entering to or leaving from that facility, and which notifies a managing person of the occurrence of an abnormal event is disclosed (see, for example, Patent Literature 1). According to this system, each of the multiple sensor units is set with a priority. The higher the priority of the sensor unit is, the shorter the cycle of obtaining the sensor value through polling is set, and the lower the priority of the sensor unit is, the longer the cycle of obtaining the sensor value through polling is set.

In addition, a system that monitors and controls, through a master-station device, the operating statuses of multiple slave-station devices, and the operation statuses of the facility is disclosed (see, for example, Patent Literature 2). According to this system, the master-station device is provided with a parameter block that registers the specifity, importance, priority, and relevancy of the position information of the slave-station device. The master-station device changes the order of polling or the cycle thereof, changes the order of searching and the cycle thereof, and forms a closed loop among the slave-station devices based on the specifity, importance, priority, and relevancy of the position information of the slave-station device registered in the parameter block. Hence, an optimized control of the multiple slave-station devices is enabled with a high efficiency.

CITATION LIST

Patent Literature

Patent Literature 1: Unexamined Japanese Patent Application Kokai Publication No. 2009-180414
Patent Literature 2: Unexamined Japanese Patent Application Kokai Publication No. H10-13973

SUMMARY OF INVENTION

Technical Problem

According to the systems disclosed in Patent Literatures 1 and 2, the management target devices are mainly unchanged. In the cases of a residential house and a building, however, the number of management target devices increases or decreases by a purchase and a replacement. In addition, the management target device has the operating time and the timing changed in accordance with the function. In such a case, it becomes difficult to maintain the optimization of the system efficiency, the stability of the system, and the responsiveness. When, in particular, the number of management target devices increases, and the processing performance of a controller becomes insufficient, there is a possibility that the system stability will be lost.

The present disclosure has been made in view of the aforementioned circumstances, and it is an objective of the present disclosure to provide a management device, a management system, a management method, and a program which can optimize the system efficiency, and which can also maintain the system stability and responsiveness.

Solution to Problem

To accomplish the above objective, a management device according to the present disclosure includes: a communicator configured to communicate with a plurality of management targets; a determiner configured to determine, based on information representing a status of each of the management targets each received by the communicator, whether a total system status of the plurality of management targets satisfies a predefined condition; and an adjuster configured to adjust, when the determiner determines that the system status satisfies the predefined condition, a communication status of the communicator in accordance with the system status and a processing performance of the management device.

Advantageous Effects of Invention

According to the present disclosure, when it is determined that, based on information representing a status of each of the management targets each received from each of the plurality of management targets, the total system status of the plurality of management targets satisfies the predefined condition, the communication status of the communicator is adjusted in accordance with the system status and a processing performance of the management device. Hence, a system operation is enabled which is in accordance with the processing performance of the management device and the total system status of the plurality of management targets. Consequently, the system efficiency can be optimized, while at the same time, the system stability and responsiveness can be maintained.

DESCRIPTION OF EMBODIMENTS

An embodiment of the present disclosure will be explained in detail below with reference to the figures.

Figure 1:
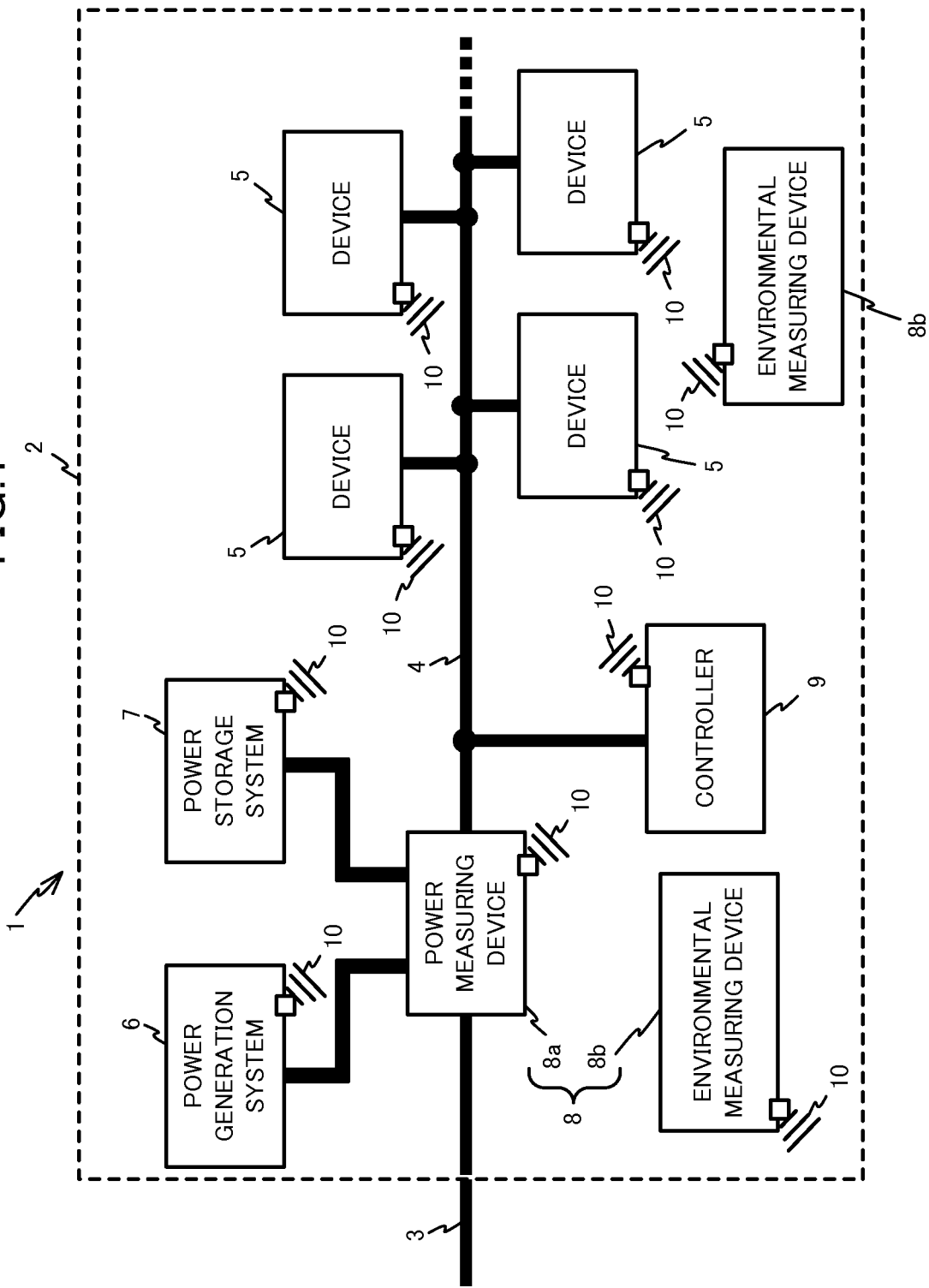
FIG. 1 is a block diagram illustrating a structure of an energy management system according to an embodiment.

FIG. 1 illustrates a structure of an energy management system 1 of this embodiment. This energy management system 1 corresponds to a management system. As illustrated in FIG. 1, the energy management system 1 is provided in a power-requiring house 2 like a residential house. The energy management system 1 is a system that manages the energy of multiple management targets provided in the power-requiring house 2.

Power is supplied to the power-requiring house 2 through an external electricity system 3. The power supplied through the electricity system 3 is further supplied to multiple devices 5 through a lamp line 4. The multiple devices 5 are home electronics or facility electronics installed in the power-requiring house 2.

The energy management system 1 includes the above-explained devices 5, a power generation system 6, a power storage system 7, a measure 8, and a controller 9. According to this embodiment, each device 5, power generation system 6, power storage system 7, and measure 8 is the management target.

Each device 5, power generation system 6, power storage system 7, measure 8, and controller 9 is provided with wireless communication device 10 respectively. Each wireless communication device 10 constructs a wireless communication network through the same communication protocol. Accordingly, in the power-requiring house 2, a wireless communication between the controller 9 and each of the management targets, that is, between the management targets is enabled.

[Device]

The devices 5 are home electronics or facility electronics. Basically, those devices 5 consume the power to provide a specific function to a user. For example, device 5 is a lighting device, a ventilation fan, an IH (Induction Heating) cooking heater, a microwave oven, a refrigerator, a rice cooker, a television, a personal computer, a room air-conditioner, a floor heater (including a heat-pump type), an electric water heater/cooler (including a heat-pump type), an electric window, and an electric window shade and so on. Each device 5 is provided with the wireless communication device 10. The wireless communication device 10 connected with each device 5 performs a wireless communication with the wireless communication device 10 connected with the controller 9. Each device 5 is monitored and controlled by the controller 9 through the wireless communication.

[Power Generation System]

The power generation system 6 is a system that generates power. A typical power generation system is a solar power generation system, a fuel cell battery, or a wind power generation system. The power generation system 6 supplies the generated power to the devices 5 in the house as electricity. In addition, the power generation system 6 reversely flows the surplus power to the electricity system 3. The power generation system 6 performs selling electricity through this reverse power flow. The power generation system 6 is also provided with the wireless communication device 10. The wireless communication device 10 connected with the power generation system 6 performs a wireless communication with the wireless communication device 10 connected with the controller 9. The power generation device 6 is monitored and controlled by the controller 9 through the wireless communication.

[Power Storage System]

The power storage system 7 is a system capable of charging and discharging the power. A typical power storage system 7 is an electric vehicle that can discharge power to a battery or to the house. The power storage system 7 is provided with the wireless communication device 10. The wireless communication device 10 connected with the power storage system 7 performs a wireless communication with the wireless communication device 10 connected with the controller 9. The power storage system 7 is monitored and controlled by the controller 9 through the wireless communication.

In this embodiment, the power generation system 6 and the power storage system 7 construct a power supply system.

[Measure]

The measure 8 is a kind of sensors that measures various physical quantities in the house. The measure 8 measures some kind of physical quantity. The measure 8 transmits the measured value to the controller 9 through the wireless communication device 10 at, for example, a periodic cycle. The measure 8 is provided with the wireless communication device 10. For example, the measure 8 performs a measurement at a cycle set by the controller 9 in advance, and transmits the measured value to the controller 9.

FIG. 1 illustrates a power measuring device 8a that is an example of measure 8. The power measuring device 8a measures the purchased/sold electricity or the purchased/sold electricity amount in the whole house. In addition, the power measuring device 8a measures the power consumption or the power consumption amount for each device 5 in the house or for each branch circuit. Still further, the power measuring device 8a measures the power consumption or the power consumption amount that was the generated by the power generation system 6. Yet still further, the power measuring device 8a measures charged/discharged power or charged/discharged power amount produced by charging/discharging of the power storage system 7.

FIG. 1 also illustrates an environmental measuring device 8b that is another example of measure 8. The environmental measuring device 8b measures environmental values in the house, such as a temperature, a humidity, a lighting intensity, a $CO_2$ concentration, an amount of solar radiation, and the presence/absence of a person.

[Controller]

The controller 9 integrally controls the whole system. The controller 9 is a computer including hardware resources, such as a CPU (Central Processing Unit) and a memory. Upon execution of a program stored in the memory by the CPU, that is, upon execution of a software program operated on the hardware resources by the controller 9, the functions of the following structural components are realized.

The controller 9 performs a wireless communication through the wireless communication device 10 connected with the controller 9 itself and each of the wireless communication device 10 connected with each of the device 5, power generation system 6, power storage system 7, or measure 8. Through this wireless communication, the controller 9 monitors the state of and controls each of the management targets.

An explanation will be given of the structure of the controller 9 in this embodiment with reference to FIG. 2.

Figure 2:
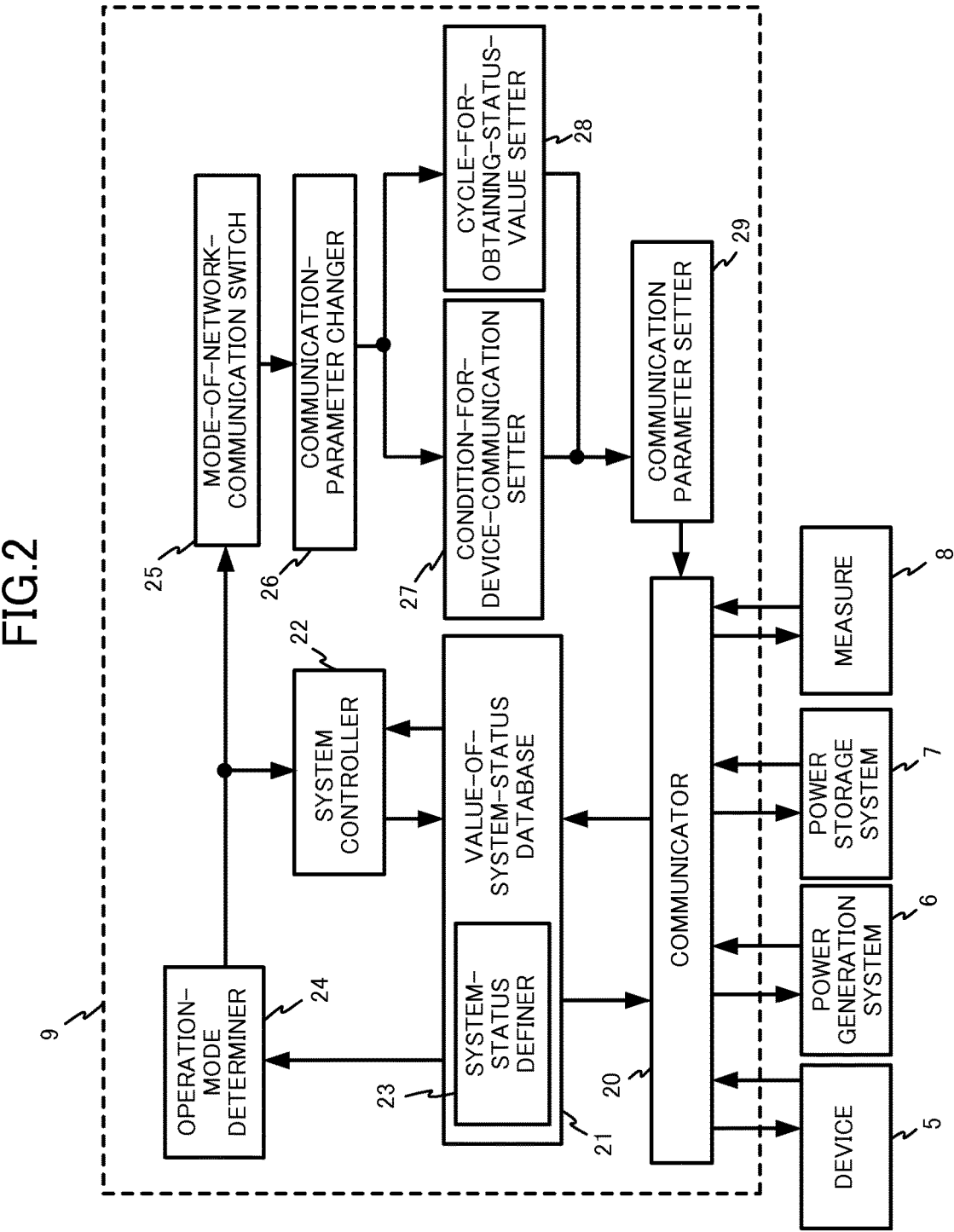
FIG. 2 is a block diagram illustrating a structure of a controller in FIG. 1.

As illustrated in FIG. 2, the controller 9 includes a communicator 20, a value-of-system-status database 21, a system controller 22, a system-status definer 23, an operation-mode determiner 24, a mode-of-network-communication switch 25, a communication-parameter changer 26, a condition-for-device-communication setter 27, a cycle-for-obtaining-status-value setter 28, and a communication-parameter setter 29.

The communicator 20 performs communication processes with the multiple management targets (including the devices 5, the power generation system 6, the power storage system 7, or the measure 8) in the power-requiring house 2. The communicator 20 converts, for example, a status-value obtaining request or a control instruction (control setting request) into a predefined communication format, and transmits the converted request to the management target. In addition, the communicator 20 transmits a control instruction (control setting request) to the devices 5, the power generation system 6, the power storage system 7 or the measure 8 in accordance with the update of a value registered in the value-of-system-status database 21. Still further, the communicator 20 receives a status value transmitted from the measurement target. The communicator 20 transmits the received status value to the value-of-system-status database 21. Hence, the status value in the value-of-system-status database 21 is updated.

The value-of-system-status database 21 is a database that stores the status value (including measured value in the case of measure 8) obtained from the management target through the communicator 20. The status value (including measured value) stored in the value-of-system-status database 21 is updated with a value obtained through the communicator 20. In addition, control setting information to the management target is written in the value-of-system-status database 21 through the control by the system controller 22. When the control setting information is written in the value-of-system-status database 21, the communicator 20 transmits, to the management target, a control instruction (control setting request) that includes the control setting information.

The system controller 22 monitors and controls the management targets (device 5, power generation system 6, power storage system 7 and measure 8) based on information (status value stored in value-of-system-status database 21) representing the status of each management target received through the communicator 20 or in accordance with an operation mode output by the operation-mode determiner 24. For example, the control contents (control instructions) contained in the control setting information are as follows:

(1) Suppressing control of power consumption on the device 5 in accordance with the generated power by the power generation system 6 and the amount of stored power by the power storage system 7;

(2) Charging/discharging control on the power storage system 7 in accordance with the generated power by the power generation system 6;

(3) Suppressing control power consumption on the device 5 in accordance with a power saving request from the user; and (4) Self-contained operation control by the power generation system 6 and the power storage system 7 at the time of emergency like the blackout of the electricity system 3.

[System-Status Definer]

The system-status definer 23 retains transition conditions that transit the total system status of the multiple management targets. The system-status definer 23 is constructed in the value-of-system-status database 21. Based on the status value that characterizes the system status, among the status values of the devices 5 (including the measured value in the case of the measure 8) stored in the value-of-system-status database 21, transition conditions are defined respectively to each of multiple system statuses. The transition conditions set by the system-status definer 23 include an automatic operation condition which is set in the system in advance and which defines the automatic operation of the system, and, a user request condition input through the user interface in accordance with a demand by the user.

[Operation-Mode Determiner]

The operation-mode determiner 24 determines, based on the status values (including measured value) of the management targets (device 5, power generation system 6, power storage system 7, and measure 8) stored in the value-of-system-status database 21, whether the total system status of the multiple management targets satisfies the transition condition of the system status defined by the system-status definer 23. The operation-mode determiner 24 outputs an operation mode in accordance with the determined system status.

[Mode-of-Network-Communication Switch]

The mode-of-network-communication switch 25 changes the communication mode of the network constructed by the wireless communication devices 10 in accordance with the operation mode output by the operation-mode determiner 24, and outputs the changed communication mode.

[Communication-Parameter Changer]

The communication-parameter changer 26 instructs, to the condition-for-device-communication setter 27 and the cycle-for-obtaining-status-value setter 28, to change the communication parameters respectively in accordance with the communication mode output by the mode-of-network-communication switch 25.

[Condition-for-Device-Communication Setter]

The condition-for-device-communication setter 27 changes and sets the priority of the management target (device 5, power generation system 6, power storage system 7, and measure 8) so as to correspond to the communication mode in accordance with the instruction from the communication-parameter changer 26. The priority of the management target contains a setting of prohibiting the communication of the management target and the operation itself of the management target.

[Cycle-for-Obtaining-Status-Value Setter]

The cycle-for-obtaining-status-value setter 28 changes and sets the communication cycle to the management targets (power generation system 6, power storage system 7, device 5, and measure 8) so as to correspond to the communication mode in accordance with the instruction from the communication-parameter changer 26. The cycle-for-obtaining-status-value setter 28 can make various settings such that, in accordance with the communication mode, the communication cycle of the communication for obtaining the status-value is extended, the communication cycle of the communication for obtaining the status-value is shortened, or the communication for obtaining the status-value is not executed. The communication cycle mainly means a cycle of repeatedly transmitting the request for obtaining status-value to each management target from the controller 9. In this case, the obtaining cycle may be set for each management target, or different communication cycles may be set for respective status values of the management target.

[Communication-Parameter Setter]

The communication-parameter setter 29 holds the communication parameter (a parameter that defines the priority and the cycle) which is set by the condition-for-device-communication setter 27 and the cycle-for-obtaining-status-value setter 28, and which defines the communication status of the communicator 20. The communicator 20 performs a communication with each of the management targets (power generation system 6, power storage system 7, device 5 and measure 8) in accordance with the communication parameter held by the communication-parameter setter 29.

The communication parameter is a parameter that defines, for example, the priority of the management target, the obtaining cycle of each kind of status values of each management target, and the kind of the status to be obtained.

In this embodiment, the mode-of-network-communication switch 25, the communication-parameter changer 26, the condition-for-device-communication setter 27, the cycle-for-obtaining-status-value setter 28, and the communication-parameter setter 29 correspond to an adjuster. Those serve as an adjuster that adjusts the communication status of the communicator 20 in accordance with the system status and the processing performance of the controller when the operation-mode determiner 24 determines that the system status satisfies the predefined condition.

A structure of the energy management system 1 will be explained in further detail.

The communicator 20 transmits, to the management targets (device 5, power generation system 6, power storage system 7 or measure 8), a request for obtaining the status-value in accordance with the communication parameter held by the communication-parameter setter 29.

The management targets (device 5, power generation system 6, power storage system 7 and measure 8) perform the following three kinds of communications over the system communication network:

(1) Replying a status-value obtaining response (hereinafter, referred to as an "obtaining response") to the status-value obtaining request (hereinafter, referred to as an "obtaining request") from the controller 9;

(2) Replying a control setting response (hereinafter, referred to as a "setting response") to a control setting request (hereinafter, referred to as a "control instruction") from the controller 9; and (3) Autonomous transmission of status change information.

The measure 8 may exchange no obtaining request and obtaining response or no setting request and setting response with the controller 9. In this case, the measure 8 may periodically transmit a measured value as the status change information.

The communicator 20 receives the response (obtaining response) to the transmitted obtaining request. This causes the status value stored in the value-of-system-status database 21 to be updated to a status value contained in the obtaining response. The system controller 22 controls the system with the status value stored in the value-of-system-status database 21. More specifically, the system controller 22 controls the control target that includes the device 5, the power generation system 6 or the power storage system 7 based on the status value representing the operation status of the device 5, the status value representing the operation or power generation status of the power generation system 6, the status value representing the operation or charging/discharging status of the power storage system 7, and the measured value of the measure 8.

[Control Instruction]

Example controllable contents by the control instruction from the controller 9 to the device 5 are suspension/operation of the device, changing of the device operation mode, changing of the device setting value, changing of the device operation performance, and setting of the device operation limit value (upper limit value of power consumption). Example controllable contents by the control instruction from the controller 9 to the power generation system 6 are suspension/operation of the power generation operation, and suppression of power generation. Example controllable contents by the control instruction from the controller 9 to the power storage system 7 are suspension/operation of the system, a charging instruction, a discharging instruction, an instruction value of charging power, and an instruction value of discharging power.

The controller 9 controls the system as explained above, and also monitors the system status. The operation-mode determiner 24 of the controller 9 periodically compares the various status values stored in the value-of-system-status database 21 with the transition conditions of the respective system statuses defined by the system-status definer 23, thereby monitoring the system status.

The operation-mode determiner 24 determines that the system status is changed when the status value registered in the value-of-system-status database 21 changes, and the changed status value matches the transition condition of each status defined by the system-status definer 23. The operation-mode determiner 24 outputs, to the system controller 22 and the mode-of-network-communication switch 25, the operation mode corresponding to the changed system status when determining that the system status is changed. The system controller 22 performs a system control in accordance with the output operation mode.

Conversely, the mode-of-network-communication switch 25 switches the communication mode when the operation mode (system status) that is an output by the operation-mode determiner 24, changes. The communication-parameter changer 26 instructs both of or either one of the condition-for-device-communication setter 27 and the cycle-for-obtaining-status-value setter 28 to change the communication parameter in accordance with the communication mode output by the mode-of-network-communication switch 25.

As to the setting of the priority for the management target, the following communication levels are applied.

[Communication Levels]

There are four communication levels as follows:

Communication Level 1: does not set a restriction for a communication with the management target, but allows the management target to operate normally;

Communication Level 2: sets a restriction for a communication with the management target. Transmission of status change information is prohibited even if the status value changes;

Communication Level 3; sets an intensive restriction for a communication with the management target. Transmission of status change information is prohibited. In addition, operation itself is restricted including the automatic control and the manual operation by the user; and Communication Level 4; sets the maximum restriction for a communication with the management target. In addition to the operation in the communication level 3, the operation is forcibly terminated even if the management target is in operation.

[Cycle-for-Obtaining-Status-Value Setter]

The cycle-for-obtaining-status-value setter 28 changes the cycle of transmitting the status-value obtaining request for each status value of the management target in accordance with the communication mode instructed by the communication-parameter changer 26. The cycle is changed by changing the following status monitoring levels.

[Status Monitoring Levels]

Status Monitoring Level 1: enhances the status monitoring. In this level, the transmission cycle of the obtaining request is shortened;

Status Monitoring Level 2; normal status;

Status Monitoring Level 3; extends the transmission cycle of the obtaining request; and Status Monitoring Level 4; infinitizes the transmission cycle of the obtaining request, and terminates the transmission of the obtaining request itself.

In the status monitoring levels 3 and 4, exchange of the obtaining request and the obtaining response is suppressed. When the status monitoring level 4 is set for all status values of the management target, the controller 9 does not transmit the obtaining request at all, and only the status change information is transmitted from the management target.

[Communication-Parameter Setter]

The communication-parameter setter 29 holds the communication parameter (communication level and status monitoring level) set by the condition-for-device-communication setter 27 and the cycle-for-obtaining-status-value setter 28.

[Setting of Communication Parameter in Accordance with Processing Performance of Controller]

The communication-parameter changer 26 sets the communication parameter in accordance with the processing performance of the controller 9. In order to optimize the system efficiency, and to maintain the system stability and responsiveness, it is necessary that the communication traffic processed by the controller 9 is less than the allowable communication traffic represented by the processing performance of the controller 9. The processing performance of the controller 9 is set in the communication-parameter changer 26 in advance. The communication-parameter changer 26 adjusts the communication parameter (communication level and status monitoring level) of the management target that is to be monitored and controlled in accordance with the processing performance that is set in advance.

The initial value of the communication parameter is set to be a value that satisfies the processing performance of the whole system. In particular, for the communication parameter relevant to the management target that is important to perform the energy management, an initial value that does not exceed the system control performance is set. Such the management targets are, for example, the power generation system 6, the power storage system 7, the device 5 that consume relatively-large power, or the power measuring device 8a that measures energy of power consumption and so on.

The initial value of the communication parameter for the other management targets is set in accordance with the number of management targets of the energy management system 1, in particular, the management targets to be controlled. Hence, the larger the number of management targets is, the longer the obtaining cycle of each status value globally becomes. Conversely, the smaller the number of management targets is, the shorter the obtaining cycle of the status value globally becomes. In addition, as to the management target that is not relatively frequently operated, a long obtaining cycle of the status value is set.

As explained above, the initial value of the communication parameter in accordance with the processing performance of the controller 9 is set based on the characteristics of the management targets at the time of system installation and the number of management targets.

The mode-of-network-communication switch 25 outputs a communication mode based on the operation mode obtained from the operation-mode determiner 24. The communication-parameter changer 26 obtains, based on a fixed value of the communication traffic set in advance in accordance with the communication mode, the predicted value of the communication traffic of the whole system. Next, the communication-parameter changer 26 changes the communication parameter in such a way that the obtained predicted value does not exceed the processing performance of the controller 9.

Next, an explanation will be given of an operation of the energy management system 1 in FIG. 1 with reference to FIG. 3.

Figure 3:
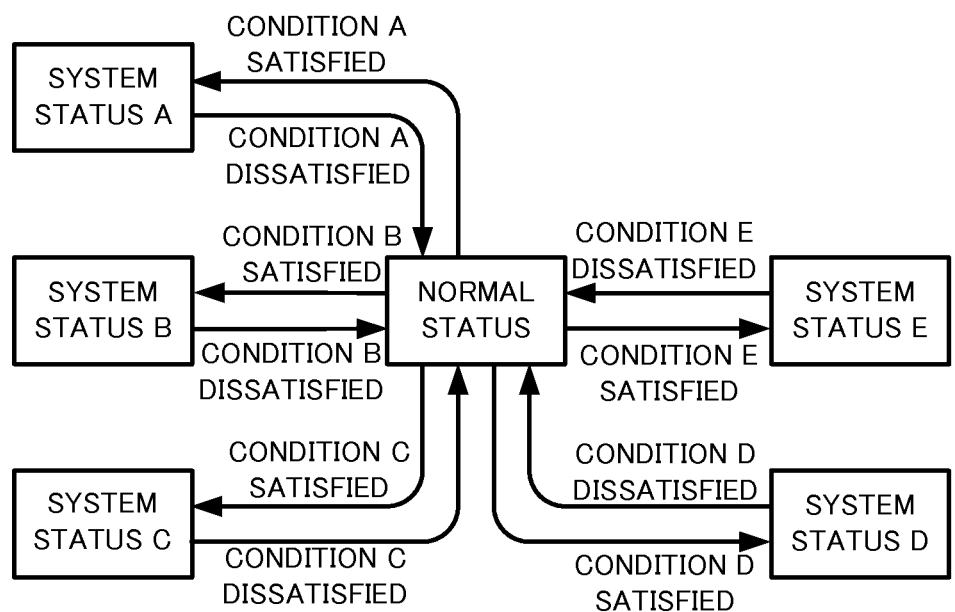
FIG. 3 is a diagram illustrating a status transition of the energy management system in FIG. 1.

FIG. 3 is a diagram illustrating a status transition of the energy management system 1. As illustrated in FIG. 3, the transitionable system status includes, in addition to a normal status, system statuses A, B, C, D and E.

The importance or urgency of the system control becomes high in the order of the system statuses A, B, C, D, E, and the normal status. The operation-mode determiner 24 outputs the operation mode in accordance with each system status.

The transition to each system status is performed based on a comparison between the transition condition of each system status set by the system-status definer 23 and the status value. When the status value satisfies the transition condition of each system status, the transition to this system status is performed. In addition, when the status value becomes no longer satisfying the transition condition of each system status, the system status returns to the normal status. When the status transits to the normal status, the communication parameter (communication level and status monitoring level) is returned to the initial value, and the prohibition of the operation of the management target is canceled. In FIG. 3, the transition to each system status is always performed from the normal status, but the direct transition among respective system statuses may be performed.

The conditions showed below are the examples of transition conditions to transit the system status (operation mode):

(Condition 1) A rate of the limit value of the power consumption (or purchased power) relative to the power consumption (or the purchased power) (for example, 50%, 75%, 90%, 100%, or 120%);

(Condition 2) A running status of the management targets (for example, the number of running devices 5);

(Condition 3) A status of the generated power of the power generation system 6;

(Condition 4) A status of stored power of the power storage system 7;

(Condition 5) Whether power can be supplied from the electricity system 3;

(Condition 6) A status of communication quality (response time, communication speed, intensity of radio wave in wireless communication and error rate of packets);

(Condition 7) Whether there are some devices 5 that are operated by a resident of the residential house;

(Condition 8) The life pattern of the resident (for example, presence/absence, wake-up/sleep, household labor/hobby); and (Condition 9) Whether an operation performed in the house or from the exterior (through a public line) (it is determined whether the transmission is made from the local network or from the network in the house based on the IP address information of the transmission originator).

Note that as to the conditions 6-9, the status monitoring level can be changed as follows:

(Condition 6) It is expected that the communication traffic may increase by re-transmission and the like to the device 5 which has the low communication quality. Hence, in order to suppress an adverse effect to the communication with the other device 5, the status monitoring level of the device 5 that has the low communication quality is set to 3 or 4, thereby decreasing the priority. When, however, the status of this device 5 remarkably affects the system status, it is important to monitor by increasing the communication traffic through re-transmission and the like. In this case, conversely, the status monitoring level is set to 1, and the communicable rate is increased.

(Condition 7) As to the device 5 operated by the resident (the device 5 not operated through the automatic control by the controller 9), the status monitoring level is set to 1.

(Condition 8) When the resident is absent, the status monitoring level is set to 3 or 4 globally. In addition, when the resident is sleeping, the status monitoring level for the device 5 relevant to the bed room like an air conditioner in the bed room is set to 2, while the status monitoring levels of the devices 5 in the other rooms or the device 5 relevant to the other devices 5 are set to 3 or 4. When the resident is carrying out a household labor like cooking, the status monitoring level of the most relevant device to that household labor is set to 1, and for the devices 5 not so relevant to the household labor, the status monitoring level is set to 2 to 4 in accordance with the relevancy to the household labor. When the resident is playing a hobby, the status monitoring levels of the whole devices 5 in the house are set to 2 to 4.

(Condition 9) When there is an access from the exterior, there is a possibility that the residents are not in the house. Hence, as to the communication with the device 5 not relevant to the external operation, the status monitoring level is set to 3 or 4.

As to each of the transition conditions to transit to any system statuses A to E, each of the above-explained conditions may be defined respectively, or the combination of the conditions 1 to 9 may be defined. The following explanation will be given of a case in which the transition condition is obtained by combining the conditions 1 to 9.

[System Status A]

The system status A is a status that requires the fastest control response. In the system status A, a control from the controller 9 to each management target (in particular, device 5) frequently occurs. A transition condition A to transit the status to the system status A is, for example, to satisfy the following (1) and (2):

(1) Power supply from the electricity system 3 is terminated due to a blackout. In this case, it is necessary to operate the whole system by the generated power of the power generation system 6 and the stored power of the power storage system 7;

(2) The total power consumption of the respective devices 5 relative to the power limit value (in this case, the total value of the generated power by the power generation system 6 and the available power from the power storage system 7) exceeds 90%.

In this status, the total power consumption of the respective devices 5 is likely to exceed the power limit value (available self-support power value). When the total power consumption of the respective devices 5 exceeds the power limit value (available self-support power value), the power supply is disabled. Hence, there is a possibility of a system-down. In this case, it is necessary to give the highest priority to the measurement of the power consumption by the power measuring device 8a, and the suspension of the device 5 or performance suppression thereof. That is, when it is determined that the rate of the power consumption relative to the power limit value is equal to or larger than the defined value, it is necessary to adjust the communication status of the communicator 20 in such a way that at least one of the communication frequency for the measured value of the power measuring device 8a and the communication frequency for the control instruction for suspending the device 5 or suppressing the performance thereof is increased. Accordingly, when the transition condition A is satisfied, the status monitoring level of the whole system is set to be the status monitoring level 4. That is, the periodical transmission of the obtaining request is terminated. Hence, what is transmitted from each device 5 becomes the status change information only. In addition, as to the device 5 that has relatively large power consumption, the communication level 4 is set to prohibit the operation. Through those controls, the rapid increase of the power consumption can be suppressed.

Figure 4:
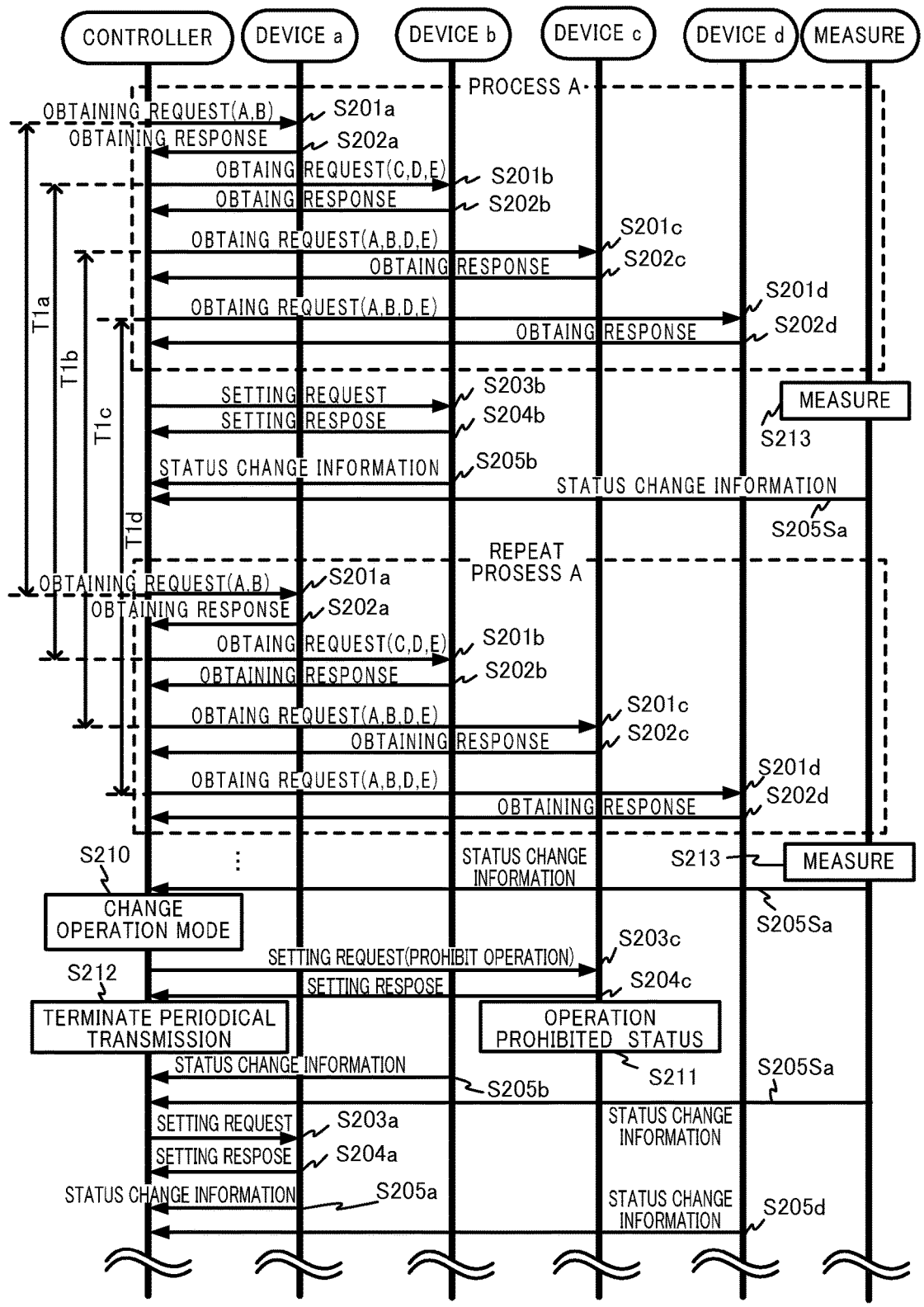
FIG. 4 is a diagram illustrating an example of communication sequence for transitioning to a system status A.

In this case, an explanation will be given of an example communication sequence to transit the status to the system status A with reference to FIG. 4. In FIG. 4, communication sequences among the controller 9, a device a, a device b, a device c, a device d, and the measure 8 (power measuring device 8a) are illustrated.

As illustrated in FIG. 4, it is presumed that the controller 9 is initially in the normal status (see FIG. 3). First, the controller 9 transmits (step S201a) the obtaining request to the device a. The kinds of the requested status values are status values A and B. The device a replies (step S202a) the obtaining response. This response contains the status values A and B.

Next, the controller 9 transmits (step S201b) the obtaining request to the device b. The kinds of the requested status values are status values C, D, and E. The device b replies (step S202b) the obtaining response. This response contains the status values C, D, and E.

Subsequently, transmission of the obtaining requests for the status values A, B, D, and E, and reply of the obtaining responses are performed (step S201c, S202c) between the controller 9 and the device c. In addition, transmission of the obtaining requests for the status values A, B, D, and E, and reply of the obtaining responses are performed (step S201d, S202d) between the controller 9 and the device d.

The measure 8 periodically performs measurement (step S213), puts the obtained measured value in the status change information, and transmits (step S205Sa) this information to the controller 9.

Thereafter, the controller 9 repeats (step S201a) transmitting the obtaining request to the device a at a cycle T1a. In addition, the controller 9 repeats (step S201b) transmitting the obtaining request to the device b at a cycle T1b. Still further, the controller 9 likewise repeats (steps S201c, S201d) transmitting the obtaining request to the devices c and d at cycles T1c, T1d, respectively. When in the normal status, the controller 9 repeatedly transmits the status-value obtaining request to each device 5 at the same cycle. Such a repeated process will be defined as a process A.

While repeating such a process A, for example, the controller 9 transmits (step S203b) a setting request to the device b, receives (step S204b) a setting response, and receives (step S205b) the status change information as needed.

It is not illustrated in FIG. 4, but the controller 9 repeats transmitting the obtaining request to the power generation system 6 and the power storage system 7 at a constant cycle in the normal status.

In this status, after receiving the status change information from the power measuring device 8a and when the measured value contained in the status change information satisfies the transition condition A, the controller 9 (operation-mode determiner 24) changes (step S210) the operation mode. Hence, the controller 9 transits to the system status A from the normal status. Subsequently, the communication parameter is changed in accordance with the operation mode as follows.

First, the communication-parameter changer 26 outputs, to the condition-for-device-communication setter 27, a communication-parameter change instruction based on the changed operation mode. The condition-for-device-communication setter 27 changes the communication level (for example, sets the communication level 4 to the device 5 that has large power consumption) of the communication parameter. After the communication level is changed, the communicator 20 transmits (step S203c), to the device c, a setting request of prohibiting the device operation. The device c transmits (step S204c) the control setting response to the effect that the operation is prohibited. Hence, the device c becomes (step S211) an operation prohibited status.

Next, the cycle-for-obtaining-status-value setter 28 sets the status monitoring level to be the status monitoring level 4 for all status values of the management targets, and terminates (step S212) the periodical transmission of the obtaining request from the controller 9.

Subsequently, the controller 9 is capable of receiving (steps S204a, S205b, S205d) the status change information from, for example, the devices a, b, and d as needed. In addition, when receiving (step S205Sa) the status change information from the measure 8, the controller 9 transmits (step S203a) the setting request to, for example, the device a as needed, thereby controlling the device a.

[System Status B]

Next, the system status B will be explained.

The system status B is a status that also requires the fast control response. In the system status B, the control from the controller 9 to each management target (in particular, the device 5) frequently occurs. A transition condition B that transits the status to the system status B is, for example, to satisfy the following (1) and (2):

(1) Power supply from the electricity system 3 is suspended due to a blackout; and (2) The total power consumption of the devices 5 relative to the power limit value (in this case, the total value of the generated power by the power generation system 6 and the available power from the power storage system 7) becomes equal to or lower than 50%.

In this status, the supplied power is slightly extra. When, however, the total power consumption of the devices 5 exceeds the power limit value (available self-support power value), the power supply is disabled. This results in a possibility of a system-down. In this case, it is necessary to give the highest priority to the measurement of the power consumption by the power measuring device 8a and to the device control, such as suspension/performance suppression of the device 5. That is, when it is determined that the rate of the power consumption to the power limit value is equal to or larger than the defined value, it is necessary to adjust the communication status of the communicator 20 in such a way that at least either one of the communication frequency for the measured value of the power measuring device 8a and the communication frequency for the control instruction for suspending the device 5 or suppressing the performance thereof is increased. Hence, when the transition condition B is satisfied, the status monitoring level of the whole system is set to be the status monitoring level 4. That is, the periodical transmission of the obtaining request is terminated. Hence, what is transmitted from each device 5 becomes the status change information only.

Figure 5:
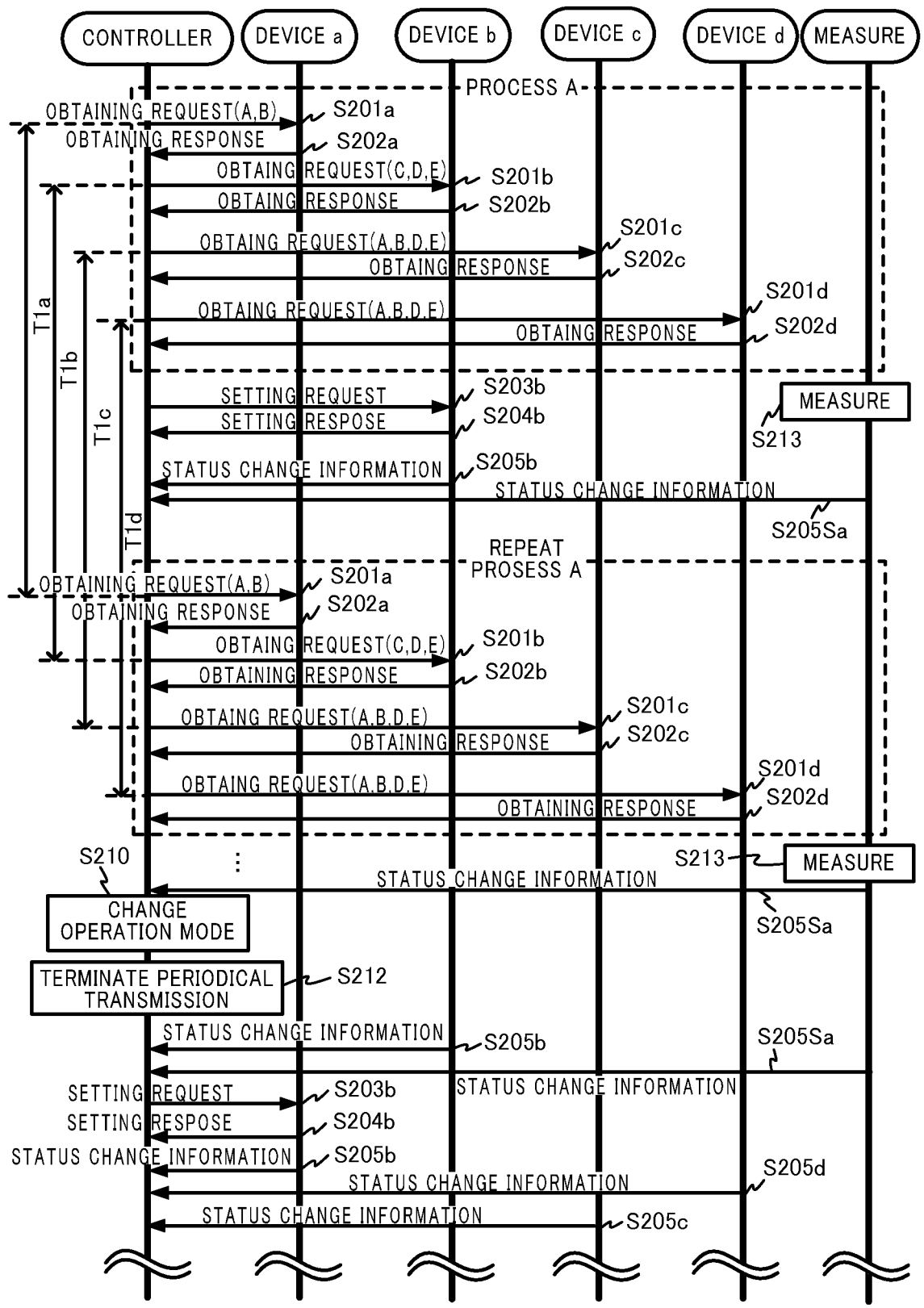
FIG. 5 is a diagram illustrating an example of communication sequence for transitioning to a system status B.

Next, an explanation will be given of an example communication sequence in the system status B with reference to FIG. 5. FIG. 5 illustrates communication sequences among the controller 9, the device a, the device b, the device c, the device d, and the measure 8 (power measuring device 8a).

As illustrated in FIG. 5, in the normal status, the controller 9 is repeating the process A at cycles T1a, T1b, T1c, and T1d. In addition, the controller 9 transmits (step S203b) the setting request to, for example, the device b, receives (step S204b) the setting response, and receives (step S205b) the status change information as needed. Although it is not illustrated in FIG. 5, the controller 9 repeats transmitting the obtaining request to the power generation system 6 and the power storage system 7 at a constant cycle. During this operation, the measure 8 performs measurement (step S213), and transmits (step S205Sa) the status change information.

In this status, after receiving the status change information from the power measuring device 8a and determining that the measured value contained in the status change information satisfies the transition condition B, the operation-mode determiner 24 of the controller 9 changes (step S210) the operation mode. Hence, the controller 9 transits to the system status B from the normal status.

Next, the cycle-for-obtaining-status-value setter 28 sets the status monitoring level to be the status monitoring level 4 for all status values of the management targets, and terminates (step S212) the periodical transmission of the obtaining request. In this case, however, no communication level is changed.

The difference from the above-explained system status A in the following process is that the status change information of the device c is receivable (step S205c).

[System Status C]

Next, an explanation will be given of the system status C.

The system status C is a status that also requires the fast control response. In the system status C, the control from the controller 9 to each management target (in particular, the device 5) frequently occurs. A transition condition C that transits the status to the system status C is, for example, to satisfy the following (1) and (2):

(1) Power can be supplied from the electricity system 3; and (2) Does not exceed the power limit value set as a power saving goal.

According to such a status, since the power can be supplied from the electricity system 3, unlike the system statuses A and B, a control that needs a relatively high responsiveness is unnecessary. In order to accomplish the power saving goal, however, an adjustment that causes the fluctuating power value not to exceed the power limit value is necessary. That is, when it is determined that the rate of the power consumption to the power limit value is equal to or larger than the defined value, the communication status of the communicator 20 needs to be adjusted in such a way that at least either one of the communication frequency for the measured value of the power measuring device 8a and the communication frequency for the control instruction for suspending the device 5 or suppressing the performance thereof is increased. Hence, in this status, also, the highest priority is given to the measurement of the power consumption by the power measuring device 8a and to the suspension/performance suppression of the device 5. Accordingly, when the transition condition C is satisfied, the status monitoring levels for some status values of the measurement targets are set to be the status monitoring level 4. That is, the periodical transmission of the obtaining request to some devices 5 in the management targets is terminated. In addition, the operation of the device 5 with relatively large power consumption that possibly causes a rapid change in power consumption is suppressed.

Figure 6:
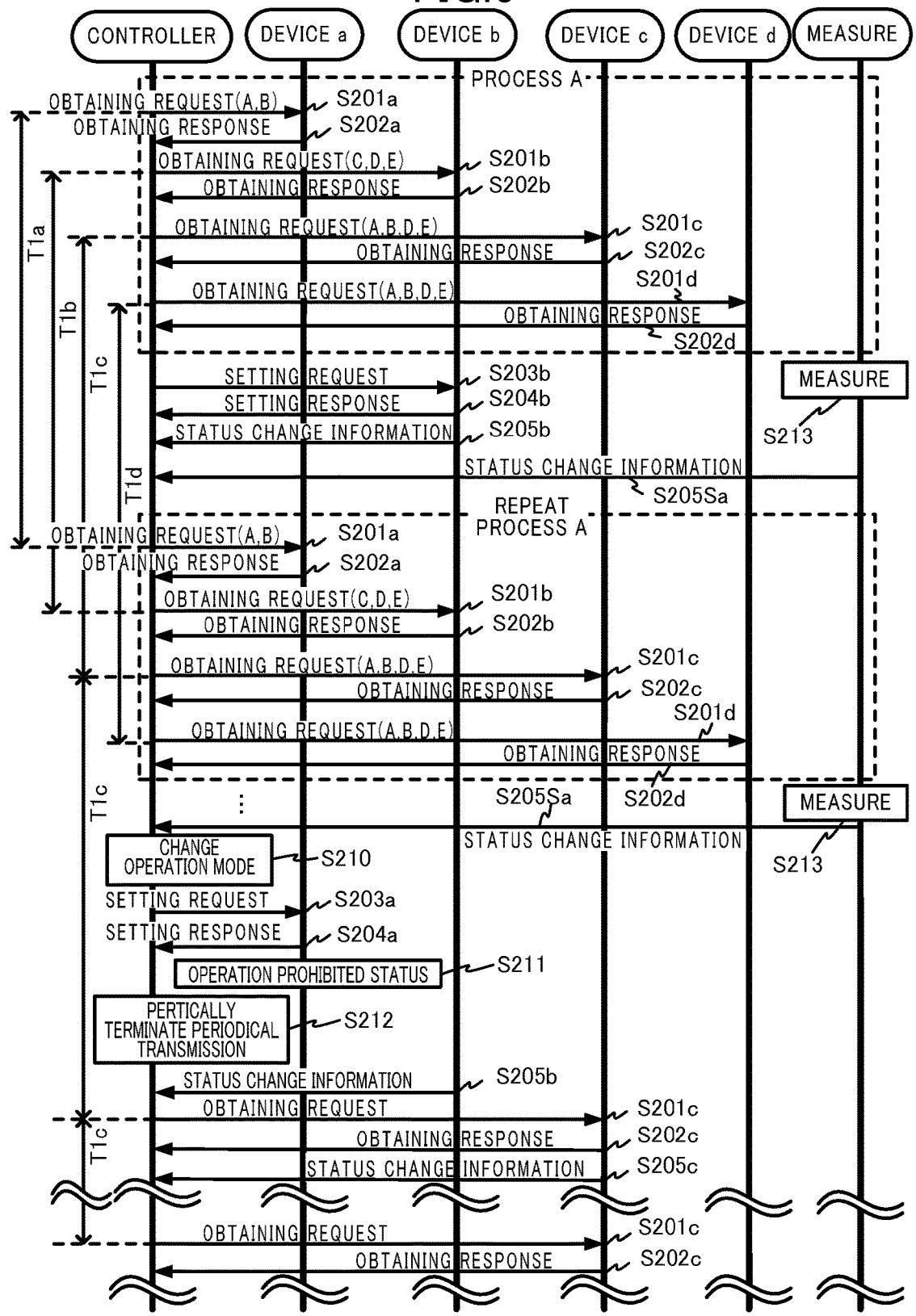
FIG. 6 is a diagram illustrating an example of communication sequence for transitioning to a system status C.

Next, an explanation will be given of an example communication sequence in the system status C with reference to FIG. 6. FIG. 6 illustrates communication sequences among the controller 9, the device a, the device b, the device c, the device d, and the measure 8 (power measuring device 8a).

As illustrated in FIG. 6, in the normal status, the controller 9 executes the same processes as those illustrated in FIGS. 4 and 5. In this status, after receiving the status change information from the power measuring device 8a and determining that the measured value contained in the status change information satisfies the transition condition C, the controller 9 (the operation-mode determiner 24) changes (step S210) the operation mode. Hence, the controller 9 transits to the system status C from the normal status. Next, the communication parameter is changed in accordance with the operation mode as follows.

First, the communication-parameter changer 26 outputs, to the condition-for-device-communication setter 27, a communication-parameter change instruction. The condition-for-device-communication setter 27 changes the communication level of the status value of the device a to be 4. After the communication level is changed, the communicator 20 transmits (step S203a) the setting request of prohibiting the device operation to, for example, the device a. The device a replies (step S204a) the setting response to the effect that the device operation is terminated. Hence, the operation of the device a is prohibited (step S211).

Next, the cycle-for-obtaining-status-value setter 28 sets the status monitoring levels of the status values of some management targets (devices a, b, and d) to be the status monitoring level 4, and terminates (step S212) the transmission of the obtaining request from the controller 9. FIG. 6 illustrates a status in which the transmission of the obtaining request to the devices a, b, and d is terminated.

Subsequently, the controller 9 likewise continues the control on the devices b and c upon receiving the status change information of, for example, the devices b and c (steps S205b and S205c). In addition, the control on the device d is also maintained. Still further, the transmission of the obtaining request to the device c and the reception of the obtaining response therefrom are repeated at a cycle T1c (steps S201c, S202c).

[System Status D]

Next, an explanation will be given of the system status D.

The system status D is an operation mode that enhances the monitoring of the management targets. The major operation in the system status D is an obtaining request of the status value to each management device from the controller 9, in particular, to the power generation system 6 and the power storage system 7. A transition condition D to transit to the system status D is, for example, to satisfy the following (1) and (2).

(1) Power can be supplied from the electricity system 3; and (2) A control mode is set which controls the devices 5 in accordance with the power generation status of the power generation system 6 to efficiently utilize the generated power and the power storage level of the power storage system 7.

According to the system that has the power generation system 6 and the power storage system 7 operated cooperatively to some level, it is unnecessary for the controller 9 to control the charging/discharging of the power storage system 7 in a real-time manner in accordance with the power generation status of the power generation system 6, but only necessary to monitor and control the devices 5 that consume power. Therefore, unlike the system statuses A to B, the system status D does not need a relatively high control responsiveness.

Hence, according to the system status D, the communication status is adjusted in such a way that the frequency of transmitting the obtaining request of the status value to the power generation system 6 or the power storage system 7 increases, and the communication frequency with the device 5 that is the other management target decreases. When a control of preventing the power consumption from exceeding the power limit value that is set as the power saving goal is performed, or the excess to some level is allowable, the status may be transited to the system status D.

Figure 7:
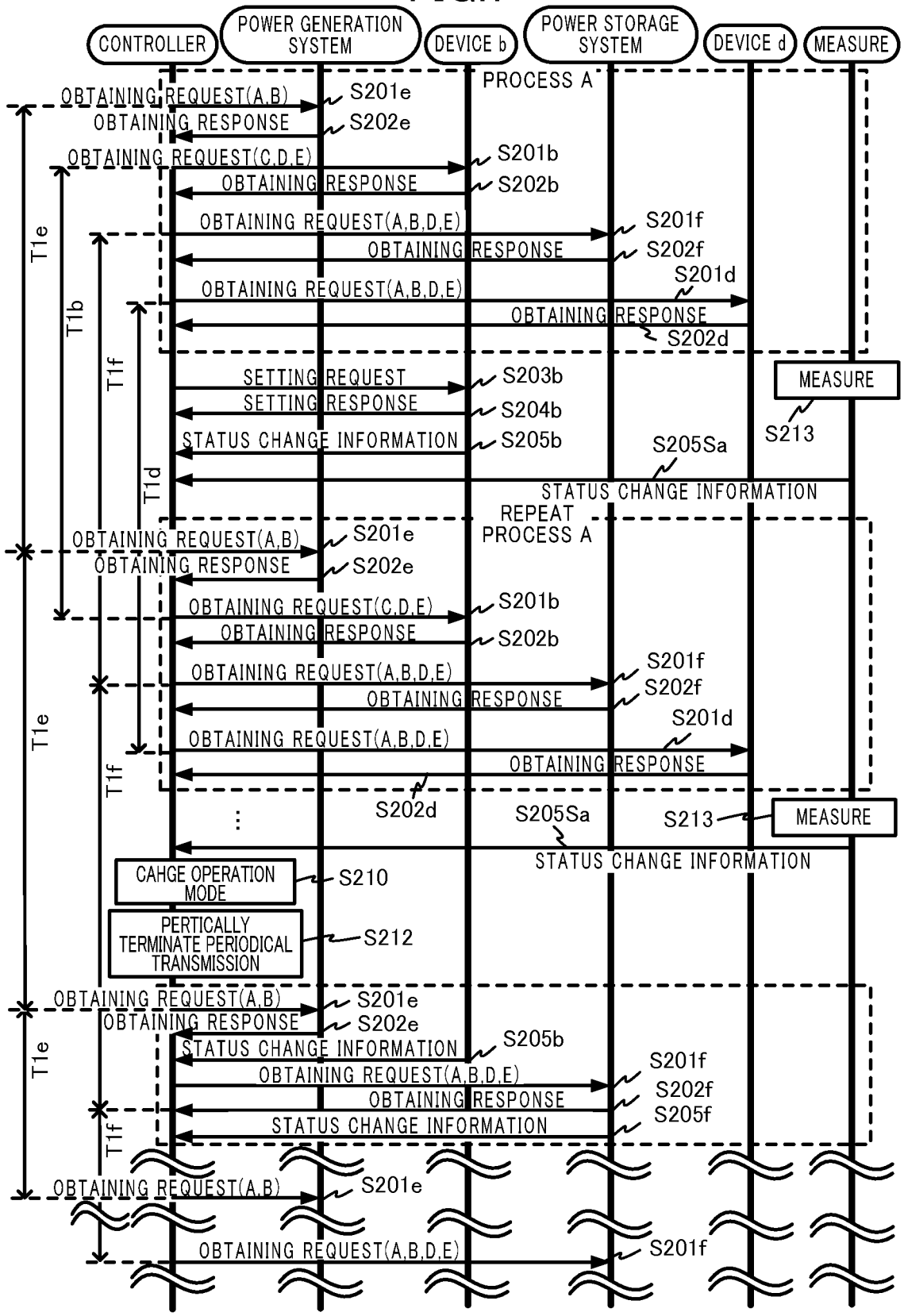
FIG. 7 is a diagram illustrating an example of communication sequence for transitioning to a system status D.

An explanation will be given of an example communication sequence in the system status D with reference to FIG. 7. FIG. 7 illustrates communication sequences among the controller 9, the power generation system 6, the device b, the power storage system 7, the device d, and the measure 8 (power measuring device 8a).

As illustrated in FIG. 7, the controller 9 transmits (step S201e) the status-value obtaining request to the power generation system 6. The power generation system 6 replies (step S202e) the status-value obtaining response as a response. The status values requested by the controller 9 to the power generation system 6 are the status values A and B.

In addition, the controller 9 transmits (step S201b) the obtaining request to the device b, and the device b transmits (step S202b) the obtaining response. The status values requested by the controller 9 to the device b are the status values C, D, and E. The controller 9 likewise transmits (steps S201f, S201d) the obtaining request to the power storage system 7 and the device d, and receives (steps S202f, S202d) the obtaining response. The power measuring device 8a periodically performs measurement (step S213), and transmits (step S205Sa) the status change information to the controller 9.

The controller 9 repeats transmitting (step S201e) the obtaining request to the power generation system 6 at a cycle T1e. In addition, the controller 9 repeats transmitting (step S201b) the obtaining request to the device b at a cycle T1b. Still further, the controller 9 likewise repeats (steps S201f, S201d) transmitting the obtaining request to the power storage system 7 and the device d at cycles T1f, T1d, respectively. As explained above, in the normal status, the controller 9 repeats transmitting the obtaining request to the power generation system 6, the power storage system 7, and each device 5 at the same cycle.

In this status, when the status change information is transmitted (step S205Sa) from the power measuring device 8a and when determining that the measured value contained in the status change information satisfies the transition condition D, the controller 9 (the operation-mode determiner 24) changes (step S210) the operation mode. Hence, the controller 9 transits to the system status D from the normal status. Subsequently, the controller 9 changes the communication parameter in accordance with the operation mode as follows.

The cycle-for-obtaining-status-value setter 28 sets the status monitoring levels of the status values of some management targets (devices b and d) to be the status monitoring level 4. Hence, the transmission of the obtaining request to those management targets is terminated (step S212). FIG. 7 illustrates a status in which the transmission of the obtaining request to the devices b and d is terminated.

After this operation, the controller 9 continues the control on the devices b and d upon, for example, receiving (step S205b) the status change information from the device b. In addition, the controller 9 repeatedly performs (steps S201e, S201f) transmitting the obtaining request to the power generation system 6 and the power storage system 7 at cycles T1a, T1c, respectively. Still further, the controller 9 receives (step S205f) the status change information from the power generation system 6 and the power storage system 7.

[System Status E]

Next, an explanation will be given of the system status E.

The system status E is a status in which the network communication traffic relatively increases. This status occurs when the number of running devices 5 and the like increases, and when the new device 5 is additionally purchased. Hence, a transition condition E is set to be the number of running devices 5 which is equal to or greater than a predefined number. Next, when the number of running devices 5 increases, or when the new device 5 is installed and the communication traffic increases, the controller 9 adjusts the communication traffic. That is, the controller 9 adjusts, when determining that the number of running devices 5 is equal to or greater than the predefined number, the communication status of the communicator 20 in such a way that the communication frequency with each device 5 decreases.

Figure 8:
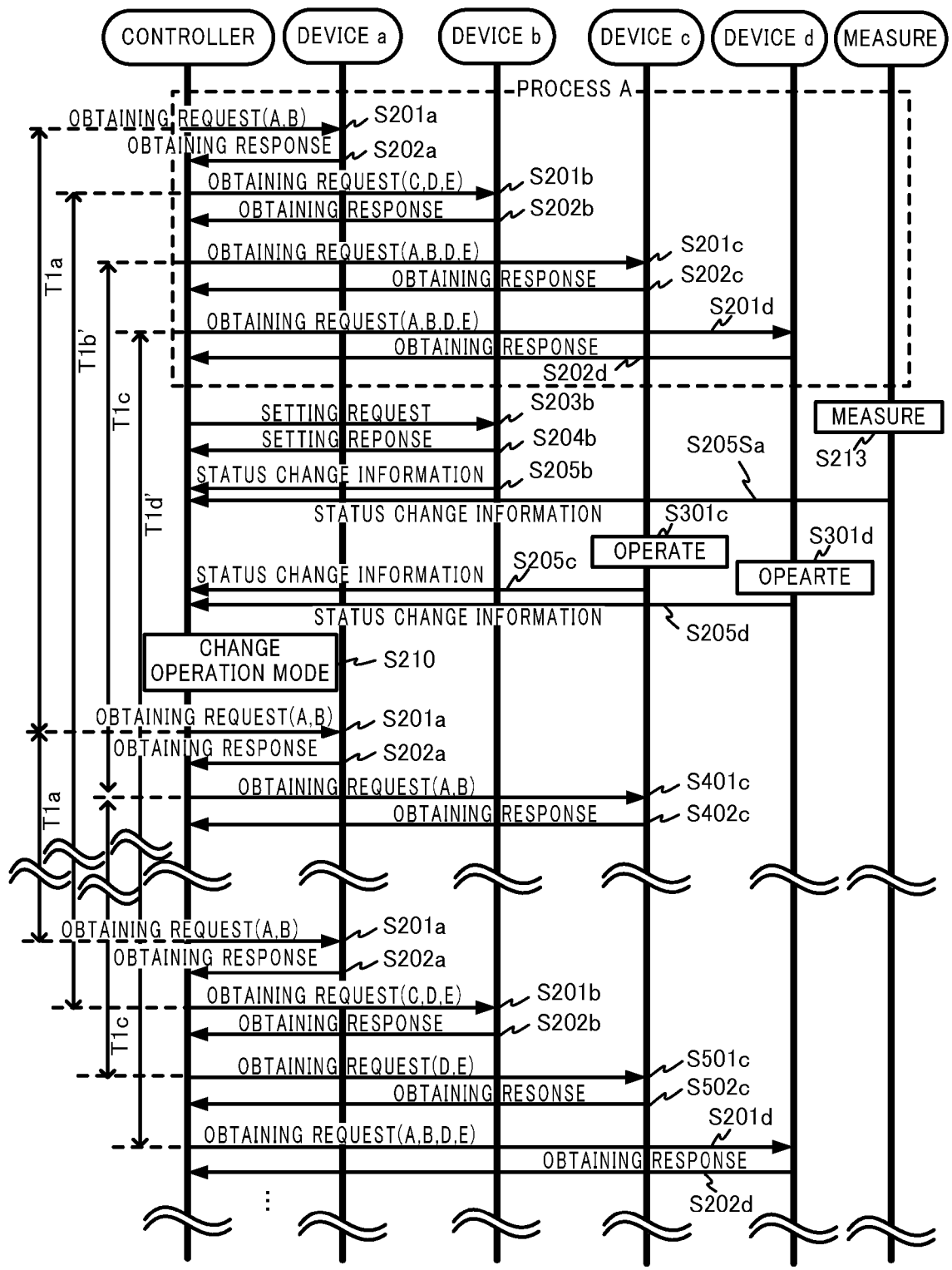
FIG. 8 is a diagram illustrating an example of communication sequence for transitioning to a system status E.

Next, an explanation will be given of an example communication sequence in the system status E with reference to FIG. 8. FIG. 8 illustrates communication sequences among the controller 9, the device a, the device b, the device c, the device d, and the measure 8 (power measuring device 8a).

As illustrated in FIG. 8, since the controller 9 is in the normal status, the controller performs the process A. In addition, for example, the controller 9 transmits (step S203b) the setting request to the device b, receives (step S204b) the setting response, and receives (step S205b) the status change information as needed. The power measuring device 8a periodically performs measurement (step S213), and transmits (step S205Sa) the result as the status change information to the controller 9.

The controller 9 repeats the process A at the cycle set for each device. although it is not illustrated in FIG. 8, the controller 9 repeats transmitting the obtaining request to the power generation system 6 and the power storage system 7 at a constant cycle.

In this case, the devices c, d transmit (steps S205c, S205d), to the controller 9, the respective status change information in accordance with the respective operations (steps S301c, S301d). When determining that the measured value contained in the status change information satisfies the transition condition E, the controller 9 (the operation-mode determiner 24) changes (step S210) the operation mode. Hence, the controller 9 transits to the system status E from the normal status. Subsequently, the controller 9 changes the communication parameter in accordance with the operation mode as follows.

When the operation mode changes, the cycle-for-obtaining-status-value setter 28 extends the obtaining-request transmission cycles (T1b' and T1d') to some devices b and d based on the communication mode corresponding to that operation mode. Hence, the communication traffic can be reduced. As to the devices a and c, the transmission of the obtaining request is repeated at the conventional cycles T1a, T1c.

As to the device c, the cycle-for-obtaining-status-value setter 28 may define the communication parameter so as to repeat the transmission (step S401c) of the obtaining request for the status values A, B, only, the reception (step S402c) of the obtaining response, the transmission (step S501c) of the obtaining request for the status values D, E, only, and, the reception (step S502c) of the obtaining response at a half cycle T1c/2 of the cycle T1c. Hence, as to the device c, the data size of the transmitted data can be reduced without decreasing the number of status values to be obtained and substantially extending the obtaining cycle of the status value.

[Communication Sequence to be Added]

An explanation will be given of a communication sequence that can be added to the communication sequences in the system statuses A to E. The communication sequence that can be added is executable in combination with the above-explained communication sequences in accordance with each of the system status A to the system status E. According to such a communication sequence, when determining that the system status satisfies the predefined condition, and requesting, to each management target, information representing the status of that management target, the controller 9 narrows down the kinds of requesting information.

Figure 9:
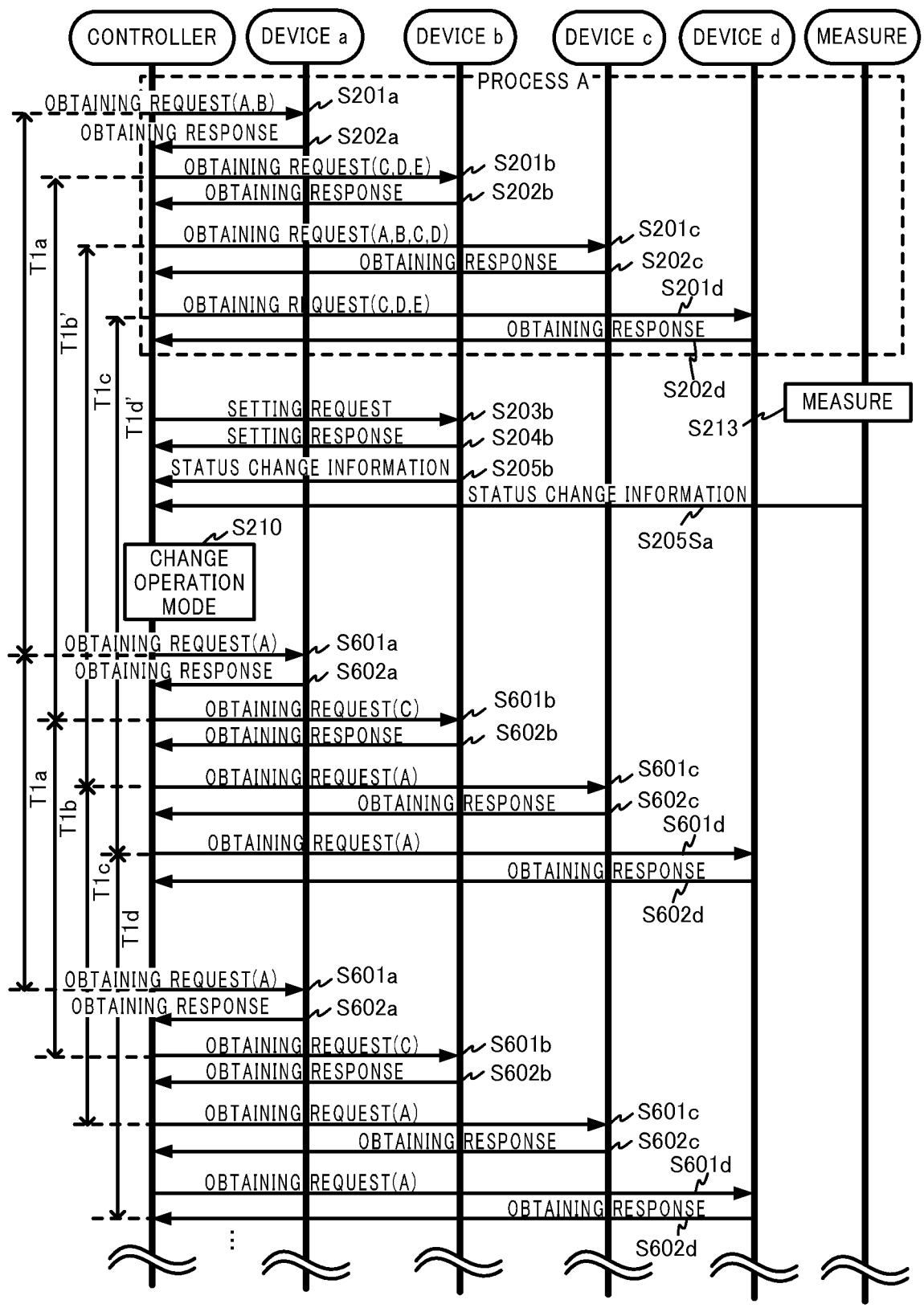
FIG. 9 is a diagram illustrating an example of additional communication sequence.

The communication sequence to be added will be explained with reference to FIG. 9. FIG. 9 illustrates communication sequences among the controller 9, the device a, the device b, the device c, the device d, and the measure 8.

As illustrated in FIG. 9, since the controller 9 is in the normal status, the controller performs the process A. In addition, for example, the controller 9 transmits (step S203b) the setting request to the device b, receives (step S204b) the setting response, and receives (step S205b) the status change information as needed. The power measuring device 8a periodically performs measurement (step S213), and transmits (step S205Sa) the result as the status change information to the controller 9.

The controller 9 transmits (step S203b) the setting request to the device b based on the arithmetic process result by the system controller 22. The device b transmits (step S204b) the control setting response. In addition, the device b transmits (step S205b) the status change information.

When receiving the status change information, the controller 9 updates the status value stored in the value-of-system-status database 21 with the measured value contained in the status change information. When the status value in the value-of-system-status database 21 is updated, the operation-mode determiner 24 changes (step S210) the operation mode. When the operation mode changes, the cycle-for-obtaining-status-value setter 28 changes, based on the communication mode corresponding to the operation mode, the transmission cycle of the obtaining request for some status values among the requested and to-be-obtained status values to be infinite. Hence, as to the status value having the obtaining cycle set to be infinite, the controller 9 does not transmit the obtaining request. Conversely, the controller 9 continues the transmission of the obtaining request for the other status values. According to this operation, the data size at the time of communication can be reduced without reducing the number of occurrences of communications, and thus the communication traffic can be reduced.

In FIG. 9, after the operation mode changes in the step S210, the controller 9 transmits (step S601a) the obtaining request for the status value A only, receives (step S602a) the obtaining response as to the device a, transmits (step S601b) the obtaining request for the status value C only and receives (step S602b) the obtaining response as to the device b, transmits (step S601c) the obtaining request for the status value A only and receives (step S602c) the obtaining response as to the device c, and transmits (step S601d) the obtaining request for the status value A only and receives (step S602d) the obtaining response as to the device d.

In this embodiment, the communication traffic may be controlled through the communication sequences illustrated in FIG. 9 in accordance with the system status as explained above. In addition, the communication traffic control through this communication sequence may be performed in combination with the communication traffic control in the system status A to the system status E as explained above.

As explained above, according to this embodiment, when it is determined that, based on the information representing the status of each management target received from the multiple management targets (device 5, power generation system 6, power storage system 7, and measure 8), the total system status of the multiple management targets satisfies the predefined transition condition, the parameters defining the communication statuses with the multiple management targets are adjusted to respective values in accordance with the processing performance of the controller 9. Hence, the system can be operated in accordance with the processing performance of the controller 9 and also the total system status of the multiple management targets. Consequently, the energy management system 1 can optimize the system efficiency, while at the same time, maintain the system stability and responsiveness.

In FIG. 1, a structure in which the wireless communication function is connected to the management target, thereby adding the wireless communication function thereto, but each management target may be originally provided with the similar wireless communication function to make the management target communicable alone.

A transition condition that is based on the measured value of environmental information measured by the environmental measuring device 8b may be also defined.

In addition, in each of the above-explained embodiments, the network structure of the energy management system 1 is based on the wireless network structure, but a wired network structure may be employed. In the case of the wired network structure, the wireless communication device 10 is replaced with a wire communication device.

Still further, it is not necessary for the energy management system 1 to always include the power generation system 6, the power storage system 7, and the environmental measuring device 8b.

The program executed in the above-explained embodiments may be distributed in a manner stored in a computer-readable non-transitory recording medium, such as a flexible disk, a CD-ROM (Compact Disk Read-Only Memory), a DVD (Digital Versatile Disk), or an MO (Magneto-Optical Disk), and may be installed to construct a system that executes the above-explained processes.

The program may be stored in a disk device or the like of a particular server device on a communication network like the Internet, and, for example, may be superimposed on carrier waves for downloading.

When the above-explained functions are shared and realized by an OS (Operating System) or are realized by the cooperative work of the OS and an application, only the portion other than the OS may be distributed in a manner stored in a medium, or may be, for example, downloaded.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application is based on Japanese Patent Application No. 2012-230745 filed on Oct. 18, 2012. The entire specification, claims, and drawings of Japanese Patent Application No. 2012-230745 are herein incorporated in this specification by reference.

INDUSTRIAL APPLICABILITY

The present disclosure is suitable for managing multiple devices. In addition, the present disclosure is suitable for managing energy to be consumed by the devices.

REFERENCE SIGNS LIST

1 Energy management system
2 Power-requiring house
3 Electricity system
4 Lamp line
5 Device
6 Power generation system
7 Power storage system
8 Measure
8a Power measuring device
8b Environmental measuring device
9 Controller
10 Wireless communication device
20 Communicator
21 Value-of-system-status database
22 System controller
23 System-status definer
24 Operation-mode determiner
25 Mode-of-network-communication switch
26 Communication-parameter changer
27 Condition-for-device-communication setter
28 Cycle-for-obtaining-status-value setter
29 Communication-parameter setter

The invention claimed is:

1. A management device comprising:
a processor and a memory, wherein the processor is configured to execute a program stored in the memory to
communicate, by a communicator, with a plurality of management targets;
determine, by a determiner, based on information representing a status of each of the management targets each received by the communicator, whether a system status of the plurality of management targets satisfies one of a plurality of transition conditions, wherein the plurality of transition conditions are defined that transit the system status of the plurality of management targets between a normal status, a status of faster control response than the normal status, a status of more enhanced monitoring of the management targets with lower control responsiveness than the normal status, and a status of more increased network communication traffic than the normal status; and
in response to the determiner determining that the system status satisfies one of the plurality of transition conditions, adjust, by an adjuster, a communication status of the communicator which increases or decreases, in accordance with the system status and a processing performance of the management device, a communication frequency of a status-obtaining request from the communicator to at least one of the plurality of management targets.

2. The management device according to claim 1, wherein the processor is further configured to control, by a system controller, based on the information representing the status of each of the management targets each received by the communicator, each of the management targets.

3. The management device according to claim 1, wherein:
the plurality of management targets include a power-consuming device, a power supply system that supplies power to the power-consuming device, and a power measuring device that measures power consumed by the power-consuming device;
the plurality of transition conditions include a condition relating to power; and
the processor is further configured to adjust, by the adjuster, in response to the determiner determining that the system status satisfies the condition relating to power, the communication status of the communicator in such a way that at least one of a communication frequency for a measured value by the power measuring device and a communication frequency for a control instruction to suspend the power-consuming device or to suppress a performance thereof, increases.

4. The management device according to claim 3, wherein the condition relating to power includes at least one of followings:
a rate of power consumption relative to a power limit value;
a status of supplied power from the power supply system; and
a fact whether a blackout is occurring.

5. The management device according to claim 1, wherein:
the plurality of management targets include a power-consuming device, a power supply system that supplies power to the power-consuming device, and a power measuring device that measures power consumed by the power-consuming device;
the plurality of transition conditions include a setting of a control mode that controls the power-consuming device based on power supplied from the power supply system; and
the processor is further configured to adjust, by the adjuster, in response to the determiner determining that the control mode is set, the communication status of the communicator so as to increase a transmission frequency for information on supplied power from the power supply system and to decrease a communication frequency for polling to the power-consuming device.

6. The management device according to claim 1, wherein:
the plurality of transition conditions include that a number of the management targets which are running is equal to or greater than a predefined number; and
the processor is further configured to adjust, by the adjuster, in response to the determiner determining that the number of the management targets which are running is equal to or greater than the predefined number, the communication status of the communicator so as to decrease a communication frequency with each of the management targets.

7. The management device according to claim 1, wherein the processor is further configured to
narrow down, by the adjuster, in response to the determiner determining that the system status satisfies one of the plurality of transition conditions and when requesting the information representing the status of each of the management targets to each of the management targets, a kind of requesting information.

8. A management system comprising:
the management device according to claim 1, and
the plurality of management targets.

9. The management system according to claim 8, wherein the plurality of management targets include a power generation system, a power storage system, a power-consuming device, and a measure that measures a predetermined physical quantity.

10. A management method utilizing a management device including a communicator communicating with a plurality of management targets, the method comprising:
a determining process of causing the management device to determine, based on information representing a status of each of the management targets each received by the communicator, whether a system status of the plurality of management targets satisfies one of a plurality of transition conditions, wherein the plurality of transition conditions are defined that transit the system status of the plurality of management targets between a normal status, a status of faster control response than the normal status, a status of more enhanced monitoring of the management targets with lower control responsiveness than the normal status, and a status of more increased network communication traffic than the normal status; and
in response to determining in the determining process that the system status satisfies one of the plurality of transition conditions, adjust, by an adjuster, a communication status of the communicator which increases or decreases, in accordance with the system status and a processing performance of the management device, a communication frequency of a status-obtaining request from the communicator to at least one of the plurality of management targets.

11. A non-transitory computer-readable recording medium that stores executable instructions that cause a computer to:
communicate, by a communicator, with a plurality of management targets;
determine, by a determiner, based on information representing a status of each of the management targets each received by the communicator, whether a system status of the plurality of management targets satisfies one of a plurality of transition conditions, wherein the plurality of transition conditions are defined that transit the system status of the plurality of management targets between a normal status, a status of faster control response than the normal status, a status of more enhanced monitoring of the management targets with lower control responsiveness than the normal status, and a status of more increased network communication traffic than the normal status; and
in response to the determiner determining that the system status satisfies one of the plurality of transition conditions, adjust, by an adjuster, a communication status of the communicator which increases or decreases, in accordance with the system status and a processing performance of the computer, a communication frequency of a status-obtaining request from the communicator to at least one of the plurality of management targets.

12. The management device according to claim 1, wherein the processor is further configured to:

store, by a system-status definer, for each of a plurality of system statuses: the plurality of transition conditions which are predefined and which transit the system status of the plurality of management targets from one of the system statuses to a different one of the system statuses;

determine, by the determiner, whether the plurality of system statuses of the plurality of management targets satisfy the plurality of transition conditions which are predefined for the different one of the system statuses;

wherein the adjuster changes at least one of (i) a priority of communication with each of the management targets and (ii) a cycle of polling by the adjuster, responsive to determining that the plurality of system statuses satisfy the plurality of transition conditions predefined for the different one of the system statuses; and transit the system status from one of the system statuses to the different one of the system statuses, in response to determining that the plurality of system statuses satisfy the plurality of transition conditions predefined for the different one of the system statuses.

* * * * *